Nov. 6, 1962    J. SCHLEIFER    3,062,463
TAKE-UP SPOOL DRIVE FOR PHOTOGRAPHIC PROJECTORS
Filed April 18, 1960    2 Sheets-Sheet 1

INVENTOR
Josef Schleifer
BY Michael S. Striker
Attorney

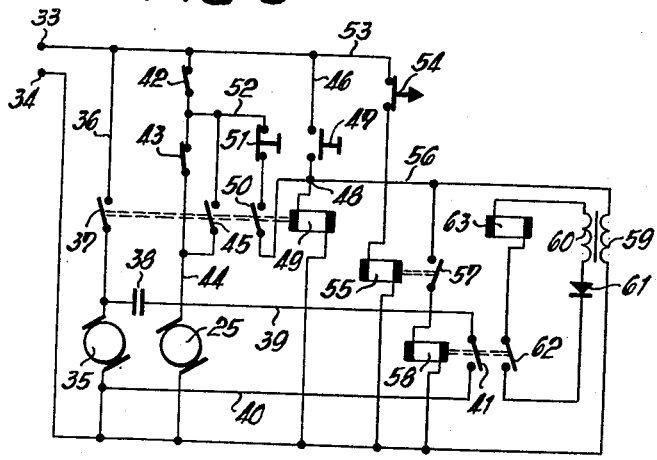

United States Patent Office 3,062,463
Patented Nov. 6, 1962

3,062,463
TAKE-UP SPOOL DRIVE FOR PHOTOGRAPHIC PROJECTORS
Josef Schleifer, Krumbach, Schwaben, Germany, assignor to Eugen Bauer G.m.b.H., Stuttgart-Unterturkheim, Germany
Filed Apr. 18, 1960, Ser. No. 22,881
Claims priority, application Germany Jan. 22, 1960
9 Claims. (Cl. 242—55.11)

The present invention relates to photographic projectors.

More particularly, the present invention relates to the structure of a photographic projector which serves to wind the film thereof onto a take-up spool.

In structures of this type it is known to provide an arrangement where the weight of the take-up spool is itself used to supply the force of friction between a pair of friction clutch elements so as to transmit a drive to the core of the take-up spool. With such an arrangement there is the disadvantage, however, that when very little film is wound on the take-up spool the weight of the latter is quite small and the moment arm which serves to turn the core of the take-up spool also is quite small so that when the projector is started, for example, there is very little pressure between the friction clutch elements and as a result the take-up spool does not turn at the beginning of the operation of the projector with a speed sufficient to wind the film onto the take-up spool at the rate at which the film is being delivered to the take-up spool. This is particularly true when the film is relatively wide and the spool is thus quite heavy. The structure which transports the film across the optical axis of the projector and through the sound reproducing structure thereof delivers the film to the take-up spool which initially cannot turn fast enough so that an extremely loose series of coils starts to form initially on the take-up spool. When the drive to the latter does start, because of the fact that the coils are so loose the drive starts without almost any resistance and reaches quite a high speed and upon closing up of the initial convolutions of the film there is a sudden jerking of the film which can result in damage to the parts of the projector or in damage to the film as well as possible tearing of the latter, particularly when the take-up spool is quite heavy.

One of the objects of the present invention is to provide a structure which will avoid the above drawbacks.

Another object of the present invention is to provide a structure which will guarantee that the driving of the take-up spool is adequate to wind the film onto the latter even during the initial phase of operation of the projector.

A further object of the present invention is to provide an arrangement which will automatically increase the force of friction between the friction clutch elements of the take-up spool assembly during the initial starting of the projector until the motors thereof reach their operating speed.

Still another object of the present invention is to provide an arrangement which will be sensitive to the tension of the film moving to the take-up spool for influencing the force of friction between the friction clutch elements.

It is also an object of the present invention to provide structure capable of accomplishing all of the above objects and at the same time composed of simple rugged elements which are very reliable in operation.

With the above objects in view the invention includes, in a photographic projector, a drive means and a driving friction clutch element driven by the drive means. A driven friction clutch element frictionally engages the driving friction clutch element to be driven thereby, and a take-up spool drive shaft is operatively connected with the driven friction clutch element to be driven thereby. A support means supports the driven friction clutch element and the take-up spool drive shaft for movement under the influence of the weight of a take-up spool carried by the shaft in a direction which presses the driven friction clutch element against the driving friction clutch element. In accordance with the present invention a means is provided to cooperate with the support means for urging the latter in the above direction with a force in excess of that derived from the weight of the take-up spool only when the projector is started, so that during the initial period of operation of the projector sufficient friction at the friction clutch to guarantee winding of the film which initially reaches the take-up spool onto the latter is guaranteed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a wiring diagram; and

FIG. 4 is a fragmentary elevation of another embodiment of a structure according to the invention.

Figure 1:
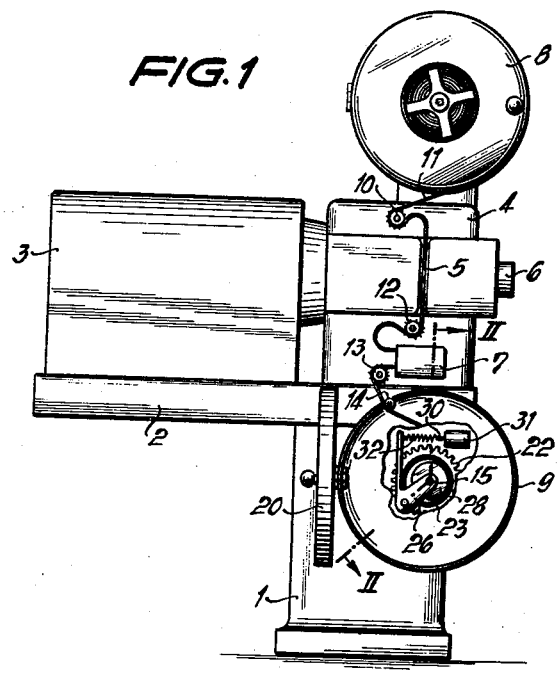
FIG. 1 is a diagrammatic side elevation of a projector according to the present invention.

Referring now to FIG. 1, it will be seen that the projector illustrated therein includes a base 1 which carries a platform 2 on which the lamp assembly 3 of the projector is located. Also, the platform 2 supports a housing 4 which carries the various mechanisms of the projector. This housing 4 is provided with the film gate 5 through which the film 11 moves in a well-known manner during projection of the frames thereof. FIG. 1 shows the objective 6 as well as the sound reproducing unit 7 of the projector, the film passing through the latter so as to have the sound reproduced in a well-known manner. Above the housing 4 is located the supply spool 8 from which the film is derived, and below the housing 4 is located the housing 9 for the take-up spool to which the film is delivered. A feed roll 10 which has conventional sprockets is carried by the housing 4 and is driven in a well-known manner to pull the film from the supply spool 8 and to deliver it to the film gate 5 through which the film is transported in a stepwise fashion by the film-transporting roll 12 which then delivers the film to the sound reproducing unit 7. A film-transporting roll 13 draws the film from the unit 7 and delivers it to the entrance guide roller 14 of the drum 9 which serves to house the take-up spool.

Figure 2:
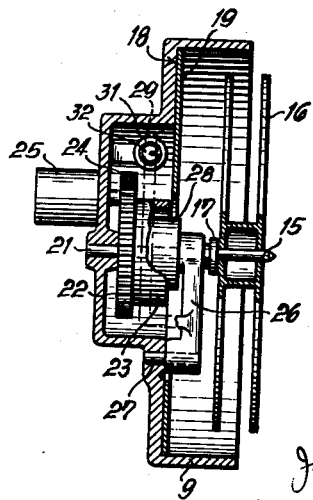
FIG. 2 is a sectional elevation of a take-up assembly according to the invention.

As may be seen from FIG. 2, within the housing or drum 9 is located a take-up spool drive shaft 15 which carries the take-up spool 16 which is constrained to rotate with the shaft 15 as, for example, by having projections of an element 17 extend into mating slots in the hub of the take-up spool 16, this annular projection 17 being fixed to the drive shaft 15 for rotation therewith and forming part thereof. The take-up spool 16 has at its center a core which co-axially surrounds the shaft 15 and onto which the film is wound.

The drum 9 has an inner wall 18 which is covered for the most part by a sheet 19 of metal or the like, and as is particularly apparent from FIG. 1 the drum or housing 9 can be opened and closed by a door 20. The inner or rear wall 18 of the drum 9 has a recessed portion which turnably supports a shaft 21 which carries a gear 22. This gear 22 fixedly carries a driving friction clutch element 23 in the form of a hollow cylinder. A pinion 24 meshes with the gear 22, and this pinion 24 is driven directly from a drive means in the form of a motor 25 which is carried by the wall 18 of the housing 9. Thus, the transmission 24, 22 serves to operatively connect the driving friction clutch element 23 to the drive means 25 to be driven by the latter.

The rotary take-up spool drive shaft 15 is turnably carried by an end portion of a support means formed by a lever 26 which is itself pivotally supported on the wall 18 by a pivot pin 27, and the portion of the drive shaft 15 which extends to the side of the lever 26 opposite from the take-up spool 16 fixedly carries the driven friction clutch element 28 in the form of a cylindrical friction element 28 in the form of a cylindrical friction clutch element located with considerable clearance within the drum 23 and pressing against an inner surface thereof. Thus, it will be seen that the pivotally supported lever 26 forms a support means which supports the driven friction clutch element 28 as well as the shaft 15 for movement under the influence of the weight of the take-up spool 16 in a direction which presses the driven friction clutch element 28 against the driving friction clutch element 23, the driven friction clutch element 28 being operatively connected with the drive shaft 15 to rotate the latter and thus drive the take-up spool 16. As is apparent from FIGS. 1 and 4 the lever 26 is inclined upwardly to the right from its pivotal support, so that it is clear that the weight of the take-up spool will urge the driven friction clutch element against the driving friction clutch element to be driven by the latter with a force in proportion to the weight of the take-up spool 16.

Referring to FIG. 2 it will be seen that the lever 26 is fixed to a lever 29 which forms with the lever 26 substantially a bell-crank lever assembly, and to the upper free end of this lever arm 29 is connected one end of a coil spring 32 whose opposite end is fixed to the armature 30 of an electromagnet 31. When this electromagnet 31 is energized (FIG. 1) it will tension the spring 32 by pulling to the right on the latter, as viewed in FIG. 1, so as to urge the lever 29 and the support means 26 to turn in a clockwise direction, as viewed in FIG. 1, so as to increase the force with which the driven friction clutch element 28 presses against the driving friction clutch element 23. When the electromagnet 31 is not energized there is only a very light tension in the spring 32 so that the friction between the friction clutch elements is determined at this time by the weight of the take-up spool 16.

Referring to FIG. 3, it will be seen that the current for the circuit illustrated in FIG. 3 is derived from the lines at the connecting points 33 and 34. The projector motor 35 which serves to drive the movable parts carried by the housing 4, such as the film-transporting mechanism, the shutter, and the like, is connected into the circuit between the connections 33 and 34 by a conductor 36 which includes the switch 37 which when closed serves to energize the projector motor 35. A starting circuit is provided to start the projector motor 35, and this starting circuit includes the condenser 38 carried by the line 39 as well as the line 40 and the switch 41 located in the circuit 39, 40 in parallel with the motor 35. The condenser 38 serves to influence a starting winding of the motor 35 so as to assist in the starting thereof.

Between the connections 33 and 34 are also located a pair of auxiliary switches 42 and 43 in a line 44 which serves to connect the winding motor 25 between the connections 33 and 34. A switch 45 is connected in parallel with the switch 43 bridging the latter, as indicated in FIG. 3.

A conductor 46 is connected electrically with the connection 33 and this conductor 46 carries the starter button 47 of the starter switch which is actuated to start the projector, the conductor 46 going to a connecting point 48. A relay coil 49 is connected to the point 48 between the latter and the electrical connection 34. Also, a switch 50 is connected to the point 48 between the latter and the portion of the line 44 which is located between the switches 42 and 43, and this line extending from the connection 48 to the line 44 also carries the stop switch 51 which is actuated to stop the operation of the projector. The portion of the conductor which extends from the stop switch 51 to the line 44 is indicated at 52. An additional conductor 53 serves to connect the point 33 with a centrifugal switch 54 which is connected in the line which leads to the relay coil 55 of a time-delay relay, this coil 55 being also connected to the connection 34. From the connecting point 48 there is also a conductor 56 which leads through the switch 57 to a starting relay coil 58 which is then connected to the connector 34. Also, the line 56 leads to the primary winding 59 of a transformer. This primary winding 59 is also connected to the connector 34, in the same way as the starter relay 58.

The secondary winding 60 of the transformer is located in a circuit with a rectifier 61 as well as with a switch 62 and the coil 63 of the electromagnet 31.

The relay 49 controls the switches 37, 45, and 50 which are normally open and which are closed when the relay 49 is energized. The time delay relay 55 controls the normally open switch 57. The starter relay 58 controls the normally open switches 41 and 62 to close the latter when the relay 58 is energized.

In order to start the projector the starter switch 47 is closed by the operator. As a result the relay coil 49 is energized and closes the switches 37, 45, and 50. The switch 50 serves to maintain the relay 49 energized even after the operator releases the starter switch 47 so that the latter opens automatically. The closed switch 45 bridges the switch 43 so as to maintain the motor 25 energized even if the switch 43 is open, and of course the closed switch 37 serves to start the projector motor 35 so that the projector starts to operate.

As long as the operating speed of the motor 35 is less than a predetermined value, which is to say less than its proper operating speed, the centrifugal switch 54 remains closed and as a result the relay 55 is energized and the switch 57 is closed. Thus, the relay 58 is energized also and the switches 41 and 62 are closed. Therefore, the condenser 38 is energized and the electromagnet 31 is energized. The motor 35 is therefore started and supplies film to the take-up spool. The energized electromagnet 31 serves to provide an increased pressure between the friction clutch elements 23 and 28 so that the take-up spool is immediately driven and holds the film which is delivered to the take-up spool under a predetermined tension even from the very start of the operation.

Once the projector motor 35 has reached its proper operating speed, the centrifugal switch 54 opens and thus serves to de-energize the coil 55. The relay 55 is a time-delay relay so that it does not immediately become unenergized but only becomes unenergized after a predetermined relatively short period of time, and this is done in order to avoid lack of uniformity in the operation of the projector motor 35 and the winding motor 25. After this predetermined short period of time the switch 57 will open and the relay 58 will become unenergized so that the switches 41 and 62 open. The condenser 38 and the electromagnet 31 are thus disconnected from the circuit. The friction between the friction clutch elements 23 and 28 is now derived solely from the weight of the take-up spool 16 together with the film which forms part thereof, and of course the weight of the element 28 itself as well as the shaft 15 will contribute to this force of friction.

In order to stop the projector the operator presses the stop switch 51 which serves to de-energize the relay 49 so that the switches 37, 45, and 50 open and now the motor 35 stops and the motor 25 also stops and the entire projector comes to a halt. The structure is shown in FIG. 3 in the position it takes when the projector is not operating.

The operation of the switches 42 and 43 is described below in connection with the embodiment of FIG. 4.

In the embodiment of FIG. 4 the support means 26 is connected to a lever arm 64 which at its top end is pivotally connected with one end of a link 65 whose opposite end is pivotally connected to a lever 66 which is supported for turning movement by a pivot pin 67 carried by the wall 18 of the housing 9. This lever 66 carries the pivot pin 68 which serves to connect the other end of the link 65 to the lever 66. The lever 66 bears against a pin 69 which is carried by a roller-carrying lever 70 which is supported for turning movement by a pin 71 carried by the wall 18 of the housing 9, and this pin 71 also carries a guide roller 72. The lever 70 carries distant from its turning axis a second guide roller 73, and as may be seen from FIG. 4 the film 11 is wound first around the entrance roller 14, then around the intermediate roller 72 and finally around the roller 73 so that when the film is under tension and being wound onto the core 78 of the take-up spool the tension of the film will serve to urge the lever 70 in a clockwise direction, as viewed in FIG. 4. The lever 70 carries a pair of leaf springs 74 and 75 which respectively cooperate with the switches 42 and 43 which are carried by the housing 9. In this way the lever 70 through the rollers 72 and 73 is capable of sensing the tension of the film in order to influence the switches 42 and 43 according to the film tension.

A spring means 76 in the form of a compression spring supported at one end on a bracket 77 fixedly carried by the wall 18 and pressing at its other end against the lever 70 serves to urge the lever 70 in a counter clockwise direction, as viewed in FIG. 4. This turning of the lever 70 in a counter clockwise direction will act through the pin 69 onto the lever 66 to pull to the right on the link 65, as viewed in FIG. 4, so that the arm 64 together with the support means 26 tends to turn in a clockwise direction, as viewed in FIG. 4, in order to increase the pressure between the friction clutch elements, so that when there is insufficient film tension acting on the roller 73 or when there is no film threaded through these rollers to the take-up spool the spring means 76 will be capable of acting through the lever means formed by the lever 70 as well as through the lever means 64—68 on the support means 26 to urge the friction clutch elements against each other with a pressure in excess of that derived from the weight of the take-up spool.

The wiring for the embodiment of FIG. 4 is the same as that shown in FIG. 3 except that the parts 59—63 are omitted.

When the projector starts to operate the film is initially guided loosely around the rollers 72 and 73. Thus, the spring means 76 maintains the lever means 70 in that position where it will act through the lever means 64—68 on the support means 26 to increase the force of friction between the friction clutch elements. The take-up spool 16 is thus quickly set into rotation so that it takes up the film 11. The loop of film around the guide rollers 72 and 73 thus becomes smaller and the tension in the film increases to turn the lever 70 downwardly, as viewed in FIG. 4, and in this way the spring 76 becomes compressed by the lever 70 so as to relieve the lever 66 from the force of the spring 76. Thus, when the projector has been operating for a relatively short period of time the tension in the film will be sufficient to eliminate the excess force at the friction clutch derived from the spring 76 and during the rest of the operation the force will be derived from the weight of the take-up spool in the manner described above.

The inclination of the lever 26 is such that a portion of the weight of the take-up spool is supported by the pivot pin 27 which pivotally supports the lever 26, so that only a part of the weight of the take-up spool is used to provide the force of friction between the friction clutch elements. This is particularly advantageous for the embodiment of FIG. 4 which is designed for use with relatively large film spools whose total weight when the film is almost entirely wound thereon provides a pressure which would be too great for the friction clutch. In order to alter the ratio between the portion of the weight used to press the friction clutch elements against each other and the portion carried by the pin 27, the wall 18 is provided with additional openings 79 and 80 adapted to selectively receive the pivot pin 27 so as to regulate the inclination of the lever 26. Also, these openings 79 and 80 are used when the projector is set up in an inclined attitude.

When the lever means 70 has been turned by the spring 76 up to its upper limiting position, when there is insufficient film tension or no film in the take-up spool assembly, the leaf spring 74 will engage the switch 42 so as to maintain the latter open. The lever 70 is in this position when there is no film in the projector or when the film tears. In this latter event the coil 49 will be unenergized because the switch 42 is open, and as a result either the projector cannot be set into operation or if it is operating it will automatically stop operating.

When the film is introduced into the projector the lever 70 takes the position shown in FIG. 4, after the film has reached its proper tension, and in this position both of the switches 42 and 43 are closed, as illustrated in FIG. 3. In this position of the parts the motor 25 will be energized even if the motor 35 is not operating. Thus, when the film is threaded by hand through the projector into the housing 9 around the rollers 14, 72 and 73 to the core 78 of the take-up spool, as illustrated in FIG. 4, the motor 25 will be energizedas soon as the operator manually winds the film onto the core 78 with a tension sufficient to locate the leaf springs 74 and 75 between the switches 42 and 43 so that both of the latter are closed. Only the core 78 of the take-up spool is shown in FIG. 4 for the sake of clarity. Thus, the motor 25 will start to operate at this time in a fully automatic manner even if the projector has not been turned on so that the motor 35 is not operating, and as a result of the take-up spool will automatically turn to wind onto the latter the film 11. Since the motor 35 is not operating there will be no continuous supply of film to the take-up spool, and as a result the motor 25 will continue to operate to tension the film turning the lever 70 beyond the position thereof shown in FIG. 4 in a clockwise direction until the leaf spring 75 engages the switch 43 to open the latter and stop the operation of the motor 25. When the projector is turned on by actuation of the button 47 in the manner described above the switch 45 will bridge the switch 43 so that the motor 25 will start to operate even though the switch 43 is open. Should the film tear the lever 70 will be immediately turned upwardly by the spring 76, in the manner described above, so as to cause the leaf spring 74 to open the switch 42 and stop the entire projector. This will prevent automatically any undesired continued feeding of the film to the take-up spool after the film tears, and this automatic stopping the projector is of particular importance in the case where extremely wide film having a greater than usual transporting speed is used in the projector.

A lever similar to the lever 70 can also be used to control an electromagnet which is used instead of the spring 76, in the manner of the embodiment of FIG. 2, for increasing the force of friction between the friction clutch elements 23 and 28.

It will be understood that each of the elements described above, or two or more together, may also find a useful application in other types of projectors differing from the types described above.

While the invention has been illustrated and described as embodied in take-up assemblies of projectors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic projector, in combination, drive means; a driving friction clutch element operatively connected to said drive means to be driven thereby; a driven friction clutch element frictionally engaging said driving friction clutch element to be driven by the latter; a take-up spool drive shaft operatively connected to said driven friction clutch element to be driven by the latter; support means supporting said driven friction clutch element and said take-up spool drive shaft for movement in a direction which provides between the friction clutch elements a pressure proportional to the weight of the take-up spool driven by said take-up spool drive shaft; and means cooperating with said support means for urging the latter in a direction which provides between said friction clutch elements a pressure greater than that determined by the weight of the take-up spool when the projector is started and for eliminating said greater pressure shortly after the projector has started.

2. In a photographic projector, in combination, drive means; a driving friction clutch element operatively connected to said drive means to be driven thereby; a driven friction clutch element frictionally engaging said driving friction clutch element; a take-up spool drive shaft operatively connected to said driven friction clutch element to be driven by the latter; a lever carrying said driven friction clutch element and the said take-up spool drive shaft; means supporting said lever for turning movement under the influence of the weight of said driven friction clutch element, said take-up spool drive shaft, and a spool carried by the latter in a direction which urges said driven friction clutch element into engagement with said driving friction clutch element so that the pressure between said friction clutch elements will be proportional to the weight of the take-up spool; and means operatively connected to said lever for urging the latter to turn in said direction with a force in addition to that provided by the weight of the take-up spool, said driven friction clutch element, and said take-up spool drive shaft, when the projector is started and for eliminating said additional force shortly after the projector has started.

3. In a photographic projector, in combination, a first drive means; a driving friction clutch element operatively connected to said first drive means to be driven thereby; a driven friction clutch element frictionally engaging said driving friction clutch element; a take-up spool drive shaft fixed to said driven friction clutch element for rotation therewith; support means supporting said driven friction clutch element and said take-up spool drive shaft for movement in a direction which urges said driven friction clutch element against said driving friction clutch element under the influence of the weight of a spool driven by said take-up spool drive shaft; electromagnetic means cooperating with said support means for urging the latter in said direction with a force in addition to that of the weight of the take-up spool when said electromagnetic means is energized; second drive means for driving the movable parts of the photographic projector; and electrical means cooperating with said second drive means and said electromagnetic means for automatically energizing the latter when the operation of the projector is started and for automatically de-energizing said electromagnetic means when said second drive means has reached its operating speed.

4. In a photographic projector, in combination, drive means; a driving friction clutch element operatively connected with said drive means to be driven thereby; a driven friction clutch element frictionally engaging said driving friction clutch element to be driven by the latter; a take-up spool drive shaft operatively connected with said driven friction clutch element to be driven by the latter; support means supporting said driven friction clutch element and said shaft for movement in a direction which maintains said driven friction clutch element in engagement with said driving friction clutch element so that the pressure of said friction clutch elements against each other will be determined by the weight of a take-up spool driven by said take-up spool drive shaft; roller means guiding film to said take-up spool; first lever means carrying said roller means; spring means cooperating with said first lever means for urging the latter to turn in a given direction and locating said first lever means in a given position when the film moving to said take-up spool is under substantially no tension or when there is no film guided by said roller means, the film guided by said roller means to said take-up spool acting through said roller means on said first lever means to turn the latter in opposition to said spring means to an intermediate position as long as the film is under a predetermined tension; and second lever means operatively connected with said first lever means and with said support means for transmitting the force of said spring means from said first lever means through said second lever means to said support means for applying said driven friction clutch element against said driving friction clutch element with a force greater than that of the weight of the take-up spool when the film guided by said roller means is not under a tension sufficient to turn said first lever means in opposition to said spring means.

5. In a photographic projector, in combination, drive means; a driving friction clutch element operatively connected to said drive means to be driven thereby; a driven friction clutch element frictionally engaging said driving friction clutch element; a take-up spool drive shaft operatively connected to said driven friction clutch element to be driven by the latter; support means supporting said driven element and said shaft for movement under the influence of the weight of a take-up spool carried by said take-up spool drive shaft in a direction which presses said driven friction clutch element against said driving friction clutch element; spring means; lever means transmitting the force of said spring means to said support means for urging said driven element against said driving element with a force in excess of that of the weight of a take-up spool carried by and driven by said shaft; and means cooperating with said lever means for acting on the latter in opposition to the force of said spring means when the film moving to the take-up spool is under a predetermined tension, so as to eliminate the additional force of said spring means whenever the film has a predetermined tension.

6. In a photographic projector, in combination, drive means; a driving friction clutch element operatively connected to said drive means to be driven thereby; a driven friction clutch element frictionally engaging said driving friction clutch element to be driven by the latter; a take-up spool drive shaft operatively connected to said driven friction clutch element to be driven by the latter; support means supporting said driven friction clutch element and said shaft for movement under the influence of the weight of a take-up spool driven by said shaft in a direction which presses said driven friction clutch element against said driving friction clutch element; first lever means having a given turning axis; a pair of film guiding rollers carried by said first lever means, one of said rollers being adjacent to and the other of said rollers being distant from the turning axis of said first lever means, the film passing around said one roller first and then passing around said other roller before proceeding to the take-up spool so that when the film is under tension it will act through said other roller to urge said first lever means to turn in a given direction around said turning axis thereof; spring means cooperating with said first lever means for urging the latter to turn in a direction opposite to the direction in which said first lever means is urged by film under tension; and second lever means cooperating with said first lever means and said support means for transmitting the force of said spring means to said support means to press said driven friction clutch element with an increased force against said driving friction clutch element when there is no film passing around said rollers or when the tension of the film is insufficient to turn said first lever means in opposition to said spring means.

7. In a photographic projector, in combination, drive means; a driving friction clutch element operatively connected to said drive means to be driven thereby; a driven friction clutch element frictionally engaging said driving friction clutch element; a take-up spool drive shaft operatively connected to said driven friction clutch element to be driven by the latter; support means supporting said driven element and said shaft for movement under the influence of the weight of a take-up spool carried by said take-up spool drive shaft in a direction which presses said driven friction clutch element against said driving friction clutch element; spring means; lever means transmitting the force of said spring means to said support means for urging said driven element against said driving element with a force in excess of that of the weight of a take-up spool carried by and driven by said shaft; means cooperating with said lever means for acting on the latter in opposition to the force of said spring means when the film moving to the take-up spool is under a predetermined tension, so as to eliminate the additional force of said spring means whenever the film has a predetermined tension; and switch means actuated by said lever means for influencing said drive means as well as a motor which drives the projector according to the tension of the film.

8. In a photographic projector, in combination, a projector motor for driving the movable parts of the projector; a film-winding motor; a driving friction clutch element operatively connected to said winding motor to be driven thereby; a driven friction clutch element frictionally engaging said driving friction clutch element to be driven by the latter; a take-up spool drive shaft operatively connected to said driven friction clutch element to be driven by the latter; support means supporting said driven friction clutch element and said take-up spool drive shaft for movement under the influence of the weight of a take-up spool driven by said drive shaft in a direction which presses said driven friction clutch element against said driving friction clutch element; lever means operatively connected to said support means; electromagnetic means operatively connected to said lever means for acting through the latter on said support means to increase the force of friction between said friction clutch elements when said electromagnet means is energized; a starting circuit operatively connected to said projector motor for energizing the latter when said starting circuit is closed, said electromagnetic means being connected into the circuit of said starting circuit to be energized only when said starting circuit of said projector motor is energized.

9. In a photographic projector, in combination, a projector motor for driving the movable parts of the projector; a film-winding motor; a driving friction clutch element operatively connected to said winding motor to be driven thereby; a driven friction clutch element frictionally engaging said driving friction clutch element to be driven by the latter; a take-up spool drive shaft operatively connected to said driven friction clutch element to be driven by the latter; support means supporting said driven friction clutch element and said take-up spool drive shaft for movement under the influence of the weight of a take-up spool driven by said drive shaft in a direction which presses said driven friction clutch element against said driving friction clutch element; lever means operatively connected to said support means; electromagnet means operatively connected to said lever means for acting through the latter on said support means to increase the force of friction between said friction clutch elements when said electromagnet means is energized; a starting circuit operatively connected to said projector motor for energizing the latter when said starting circuit is closed, said electromagnetic means being connected into the circuit of said starting circuit to be energized only when said starting circuit of said projector motor is energized; and means for opening said circuit only a predetermined time after said projector motor has reached its operating speed.

References Cited in the file of this patent

UNITED STATES PATENTS 2,461,033    Canady _____ Feb. 8, 1949